G. DEFFEBACH & C. HOWARD.
HORSE COVER.
APPLICATION FILED OCT. 12, 1914.
1,164,480.
Patented Dec. 14, 1915.
2 SHEETS—SHEET 1.
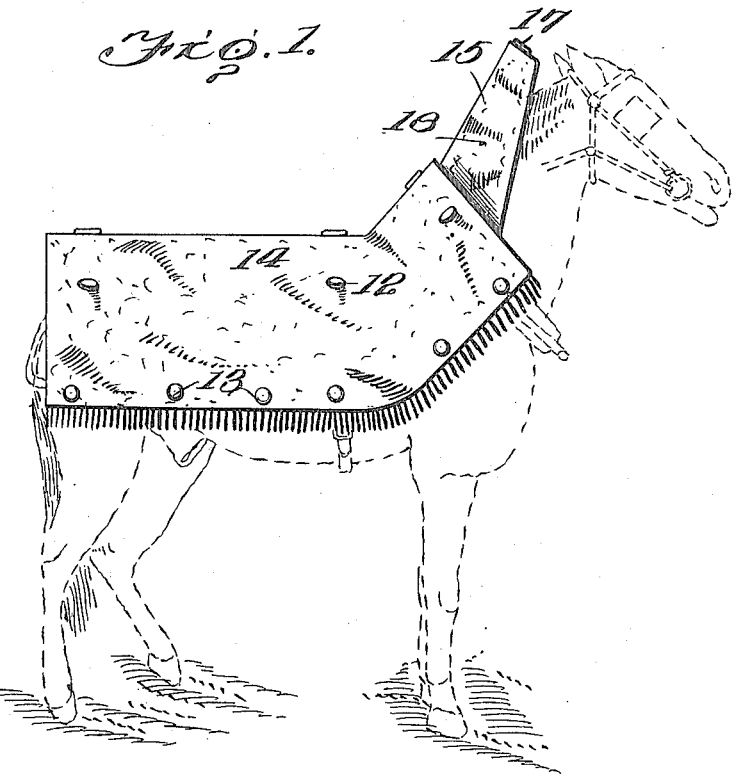
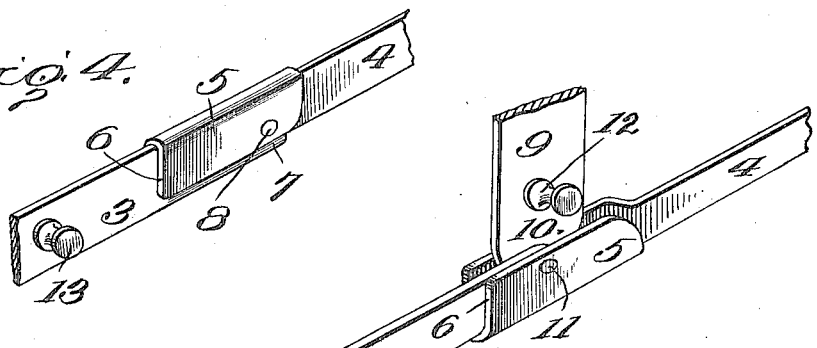
Witnesses
J. F. Byrne
Chas. J. Ohnum
Inventors
G. Deffebach and
C. Howard.
By O. Randolph Jr.,
Attorney

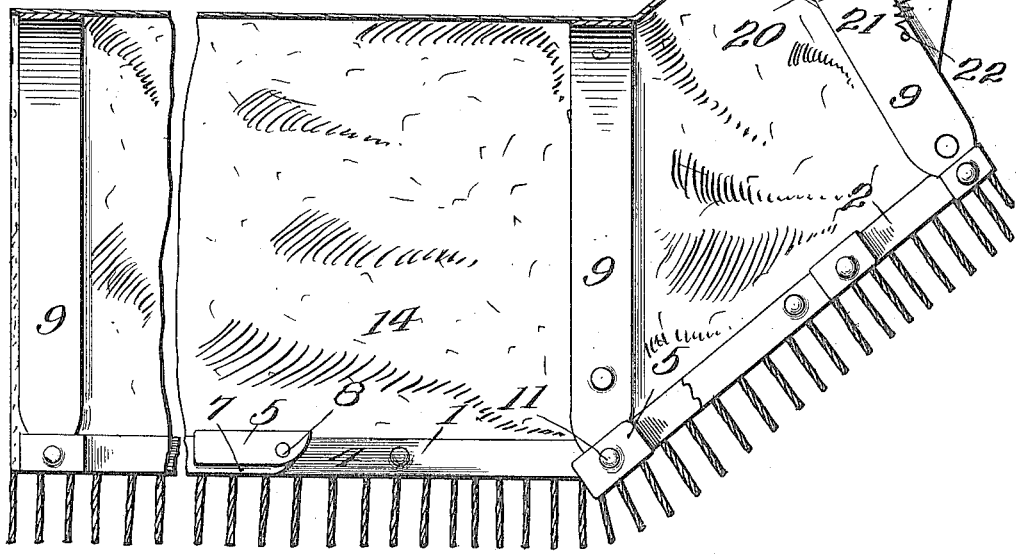
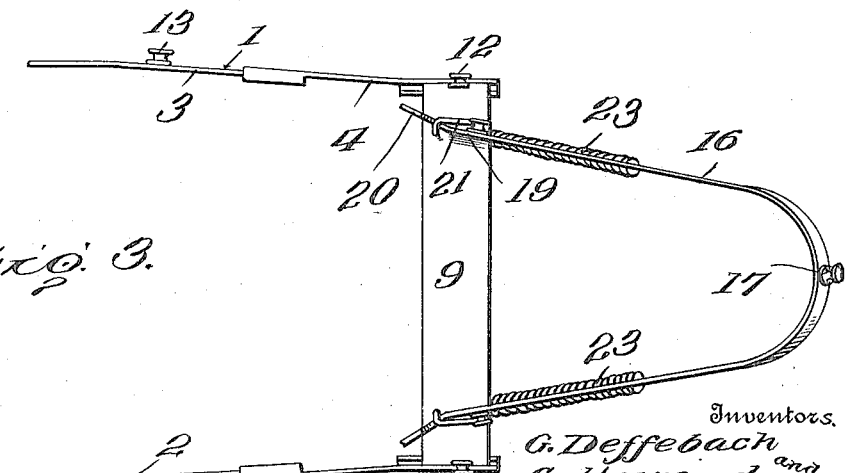

UNITED STATES PATENT OFFICE.

GARILOUS DEFFEBACH AND CORNELIUS HOWARD, OF GAS, KANSAS.

HORSE-COVER.

1,164,480.  Specification of Letters Patent.  Patented Dec. 14, 1915.

Application filed October 12, 1914. Serial No. 866,339.

*To all whom it may concern:*

Be it known that we, GARILOUS DEFFEBACH and CORNELIUS HOWARD, citizens of the United States, residing at Gas, in the county of Allen and State of Kansas, have invented certain new and useful Improvements in Horse-Covers; and we do hereby declare the following to be a full, clear, and exact description of the invention, such as will enable others skilled in the art to which it appertains to make and use the same.

This invention relates to new and useful improvements in horse covers, and has for its principal object to provide a canopy which will effectively protect the horse from the effects of the elements.

Another object of the invention is to provide a canopy having a removable and interchangeable cover so that the device may be used for all classes of weather.

A further object of the invention is to provide a device of the above description in which the cover is spaced from the back of the animal to permit the air to circulate freely thereover and prevent the said animal from becoming overheated.

With these and other objects in view, the invention consists in the novel combination and arrangement of parts which will be fully set forth in the following specification and accompanying drawings, in which—

Figure 1 is a perspective view of the cover showing the same as it would appear when in use, Fig. 2 is a longitudinal sectional view of the cover illustrating the details of construction, Fig. 3 is a top plan view of a fragment of the supporting frame, Fig. 4 is a detail perspective view of a fragment of the supporting frame illustrating the hinge joint, and Fig. 5 is a view similar to Fig. 4 illustrating the method of securing one of the uprights in place.

Referring now to the drawings by characters of reference, the numerals 1 and 2 designate the side members of the cover which comprise a plurality of sections 3 and 4, each of which is connected to the adjacent section by means of the joint illustrated in Fig. 4. This joint is formed by providing the member 4 near its ends with a lateral extension 5 which is bent back upon itself as at 6 to form a channel in which the end 7 of the member 3 extends. Suitable registering apertures are provided in the members 4, 5, and 7, and are arranged to receive the rivet 8 which forms the pivot on which the bars are folded. At the point where the U-shaped members 9 are connected to the bars 1 and 2, the distance between the bent-back portion and the member 4 is substantially twice the thickness of the metal so that the end 7 of the member 3 and the end 10 of the U-shaped member 9 may be riveted in place as at 11. These U-shaped members which are preferably three in number, are provided at the free ends of their arms with the buttons 12 which are arranged to coöperate with the buttons 13 carried by the members 3 and 4 in supporting the cover 14 in proper position.

In order to protect the head of the animal there is provided a suitable hood designated generally by the numeral 15 which comprises the U-shaped member 16, the bight portion of which carries a suitable button 17 to which the cover member 18 is secured. The free ends of the arms of this U-shaped member are bent angularly as at 19 and terminate in the hooks 20 which are arranged to extend to the bight portion of the staples 21 carried by the arms of the forward U-shaped member 9. Suitably secured as at 22 to the U-shaped members 9 and 15 respectively is a coil spring 23 which is arranged to hold the U-shaped member 15 in proper position.

It will be apparent from the foregoing that in use the cover members 14 and 18 are secured to their respective frames by means of the buttons 12, 13, and 17 and the device supported on the back of the animal, thus protecting the said animal from the effects of the elements.

While in the foregoing there has been shown and described the preferred embodiment of this invention, it is to be understood that such changes may be made in the combination and arrangement of parts as will fall within the spirit and scope of the invention as defined in the appended claim.

Having thus described our invention, we claim:

A horse cover comprising a collapsible frame, said frame being formed of a plurality of bars hingedly connected together, U-shaped members connecting the bars, buttons carried by the U-shaped members, a cover arranged to be removably secured to the bars and U-shaped members, staples carried by the foremost U-shaped member, a frame member having a cover secured thereto, said frame member being arranged to cover the head of the animal, and hooks on the ends of the frame member arranged to extend through the staples to hold the frame member detachably in place.

In testimony whereof we affix our signatures in present of two witnesses.

GARILOUS $\overset{\text{his}}{\times}$ DEFFEBACH.

CORNELIUS $\overset{\text{mark}}{}$ HOWARD.

Witnesses:
   J. B. FORRESTER,
   ED WORDWELL.

Copies of this patent may be obtained for five cents each, by addressing the "Commissioner of Patents. Washington, D. C."